(12) United States Patent
Yuan et al.

(10) Patent No.: US 12,014,483 B2
(45) Date of Patent: Jun. 18, 2024

(54) ANALYZING EDGE CLOSURES OF METAL SURFACE PARTICLES BASED ON GRAPH STRUCTURES

(71) Applicant: International Business Machines Corporation, Armonk, NY (US)

(72) Inventors: Zhong Fang Yuan, Xi'an (CN); Hong Bing Zhang, Beijing (CN); Tong Liu, Xi'an (CN); Dan Zhang, Beijing (CN); Yi Chen Zhong, Shanghai (CN); Xu Min, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 17/671,321

(22) Filed: Feb. 14, 2022

(65) Prior Publication Data
US 2023/0260099 A1   Aug. 17, 2023

(51) Int. Cl.
*G06T 7/13* (2017.01)
*G06T 7/00* (2017.01)

(52) U.S. Cl.
CPC .............. *G06T 7/0004* (2013.01); *G06T 7/13* (2017.01); *G06T 2207/20164* (2013.01); *G06T 2207/30136* (2013.01)

(58) Field of Classification Search
CPC .......... G06T 7/10; G06T 7/149; G06T 7/162; G06T 7/187; G06T 7/0004; G06T 7/13; G06T 2207/20164; G06T 2207/30136; G06T 7/62; G06T 7/181

USPC ....... 382/100, 108, 155–158, 171, 199, 266, 382/279
See application file for complete search history.

(56) References Cited

U.S. PATENT DOCUMENTS

| | | | |
|---|---|---|---|
| 8,842,915 B2* | 9/2014 | Zhou | G06T 7/162 382/173 |
| 8,898,093 B1* | 11/2014 | Helmsen | G06N 7/01 706/12 |
| 11,232,543 B2* | 1/2022 | Wang | G06T 7/11 |
| 2002/0154308 A1* | 10/2002 | Uesugi | B21C 51/005 356/431 |
| 2013/0121593 A1* | 5/2013 | Wang | G06V 10/755 382/199 |
| 2015/0015887 A1* | 1/2015 | Tin | G01N 33/20 356/445 |
| 2022/0214263 A1* | 7/2022 | Walter | G01N 15/0612 |
| 2022/0405936 A1* | 12/2022 | Poliwoda | G06T 7/30 |
| 2023/0245329 A1* | 8/2023 | Miao | G06T 7/162 382/103 |

FOREIGN PATENT DOCUMENTS

| | | |
|---|---|---|
| CN | 103745468 B | 2/2017 |
| CN | 103080984 B | 4/2017 |
| CN | 112330628 A | 2/2021 |

(Continued)

OTHER PUBLICATIONS

Martinez et al., "Quality inspection of machined metal parts using an image fusion technique," Measurement, 2017, 30 pages.

(Continued)

*Primary Examiner* — Sheela C Chawan
(74) *Attorney, Agent, or Firm* — Zilka-Kotab, P.C.

(57) ABSTRACT

Analysis of edge closures of metal surface particles based on a graph structure.

25 Claims, 7 Drawing Sheets

(56) References Cited

FOREIGN PATENT DOCUMENTS

CN            112365494 A      2/2021

OTHER PUBLICATIONS

Tian et al., "Improved Sobel algorithm for defect detection of rail surfaces with enhanced efficiency and accuracy," Journal of Central South University, vol. 23, 2016, pp. 2867-2875.

Struers, "Metallic Grain Structures and Microscopic Analysis," Struers, 2021, 27 pages, retrieved from https://www.struers.com/en/Knowledge/Materials/Metallic-grain-structures#.

Sharma, P., "Computer Vision Tutorial: A Step-by-Step Introduction to Image Segmentation Techniques (Part 1)," Analytics Vidhya, Apr. 1, 2019, 21 pages, retrieved from https://www.analyticsvidhya.com/blog/2019/04/introduction-image-segmentation-techniques-python/.

Vadapalli, P., "Image Segmentation Techniques [Step By Step Implementation]," upGrad, Feb. 19, 2021, 19 pages, retrieved from https://www.upgrad.com/blog/image-segmentation-techniques/.

Dinh, T., "Graph data structure cheat sheet for coding interviews," towards data science, Apr. 10, 2020, 17 pages, retrieved from https://towardsdatascience.com/graph-data-structure-cheat-sheet-for-coding-interviews-a38aadf8aa87.

Wikipedia, "Graph (abstract data type)," Wikipedia, 2022, 6 pages, retrieved from https://en.wikipedia.org/wiki/Graph_(abstract_data_type).

Wikipedia, "Image segmentation," Wikipedia, 2022, 25 pages, retrieved from https://en.wikipedia.org/wiki/Image_segmentation.

* cited by examiner

ANALYZING EDGE CLOSURES OF METAL SURFACE PARTICLES BASED ON GRAPH STRUCTURES

BACKGROUND

The present invention relates to graph structures, and more particularly, this invention relates to analysis of edge closures of metal surface particles based on a graph structure.

For industrial production, grain size identification is often used to determine the quality of products, such as for the detection of imperfections in processed steel, nano-metal materials such as perovskite films, etc. Processing "fuzzy" (e.g., distorted, out of focus, blurred, indefinite, etc.) lines in images is a challenge for machine vision recognition. For example, machine vision recognition struggles to detect clear dividing lines in metallographic images.

BRIEF SUMMARY

A computer-implemented method, according to one aspect, includes using an image segmentation technique to detect points and edges in an image and classifying at least some of the edges into candidate edges and strong edges based at least in part on a confidence level assigned to the respective edge. For the points detected in the image, the method includes using a convolution operation to extract visual information around the respective point and generating a graph structure including nodes based on the detected points and edges. Generating the graph structure includes using the visual information to assign initial information values to the nodes and updating nodes in the graph structure with information about neighboring nodes. Based at least in part on relationships between the nodes, the method includes determining whether each of the candidate edges is a closed edge. The method improves grain size identification processes for determining the quality of products by identifying true dividing lines in the image.

In optional approaches, the method includes classifying the points into intersection points, end points and free points based at least in part on the detected edges. This optional approach improves the accuracy of the determination of closed edges.

A computer program product, according to another aspect, includes one or more computer readable storage media, and program instructions collectively stored on the one or more computer readable storage media. The program instructions include program instructions to use an image segmentation technique to detect points and edges in an image and classify at least some of the edges into candidate edges and strong edges based at least in part on a confidence level assigned to the respective edge. The program instructions include program instructions to, for the points detected in the image, use a convolution operation to extract visual information around the respective point and generate a graph structure including nodes based on the detected points and edges. Generating the graph structure includes using the visual information to assign initial information values to the nodes and updating nodes in the graph structure with information about neighboring nodes. The program instructions include program instructions to determine whether each of the candidate edges is a closed edge, based at least in part on relationships between the nodes. The computer program product improves grain size identification processes for determining the quality of products by identifying true dividing lines in the image.

In optional approaches, the image is a metallurgical image. This optional approach enables detection of imperfections in a product shown in the metallurgical image.

A system, according to another aspect, includes a processor and logic integrated with the processor, executable by the processor, or integrated with and executable by the processor. The logic is configured to use an image segmentation technique to detect points and edges in an image and classify at least some of the edges into candidate edges and strong edges based at least in part on a confidence level assigned to the respective edge. For the points detected in the image, the logic is configured to use a convolution operation to extract visual information around the respective point and generate a graph structure including nodes based on the detected points and edges. Generating the graph structure includes using the visual information to assign initial information values to the nodes and updating nodes in the graph structure with information about neighboring nodes. The logic is configured to determine whether each of the candidate edges is a closed edge, based at least in part on relationships between the nodes. The system improves grain size identification processes for determining the quality of products by identifying true dividing lines in the image.

In optional approaches, the logic is configured to detect imperfections in a product shown in the metallurgical image. This optional approach improves quality judgement for metallurgical materials.

A computer-implemented method, according to one aspect, includes detecting points in an image of surface particles of a material, detecting edges in the image, and classifying at least some of the edges into candidate edges and strong edges based at least in part on a confidence level assigned to the respective edge. For the points detected in the image, the method includes using a convolution operation to extract visual information around the respective point and generating a graph structure including nodes based on the detected points and edges. Generating the graph structure includes determining whether a strong edge exists between adjacent pairs of the points and updating nodes in the graph structure with information about neighboring nodes. The method includes selecting candidate edges as closed edges based on relationships of the updated nodes in the graph structure. The method advantageously uses visual information in combination with a graph structure to more accurately analyze the edge closure of surface particles compared to conventional techniques.

In optional approaches, the method includes taking each point as the center in the convolution operation. This optional approach improves the accuracy of the determination of closed edges by gathering more contextual information for each point.

A computer program product, according to another aspect, includes one or more computer readable storage media, and program instructions collectively stored on the one or more computer readable storage media. The program instructions include program instructions to detect points in an image of surface particles of a material, detect edges in the image, and classify at least some of the edges into candidate edges and strong edges based at least in part on a confidence level assigned to the respective edge. The program instructions include program instructions to, for the points detected in the image, use a convolution operation to extract visual information around the respective point and generate a graph structure including nodes based on the detected points and edges. Generating the graph structure includes determining whether a strong edge exists between adjacent pairs of the points. The program instructions include program instructions to update nodes in the graph structure with information about neighboring nodes and select candidate edges as closed edges based on relationships of the updated nodes in the graph structure. The computer program product advantageously uses visual information in combination with a graph structure to more accurately analyze the edge closure of surface particles compared to conventional techniques.

In optional approaches, the program instructions include program instructions to take each point as the center in the convolution operation. This optional approach improves the accuracy of the determination of closed edges by gathering more contextual information for each point.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several aspects of analysis of edge closures of metal surface particles based on a graph structure.

In one general aspect, a computer-implemented method includes using an image segmentation technique to detect points and edges in an image and classifying at least some of the edges into candidate edges and strong edges based at least in part on a confidence level assigned to the respective edge. For the points detected in the image, the method includes using a convolution operation to extract visual information around the respective point and generating a graph structure including nodes based on the detected points and edges. Generating the graph structure includes using the visual information to assign initial information values to the nodes and updating nodes in the graph structure with information about neighboring nodes. Based at least in part on relationships between the nodes, the method includes determining whether each of the candidate edges is a closed edge.

In one general aspect, a computer program product includes one or more computer readable storage media, and program instructions collectively stored on the one or more computer readable storage media. The program instructions include program instructions to use an image segmentation technique to detect points and edges in an image and classify at least some of the edges into candidate edges and strong edges based at least in part on a confidence level assigned to the respective edge. The program instructions include program instructions to, for the points detected in the image, use a convolution operation to extract visual information around the respective point and generate a graph structure including nodes based on the detected points and edges. Generating the graph structure includes using the visual information to assign initial information values to the nodes and updating nodes in the graph structure with information about neighboring nodes. The program instructions include program instructions to determine whether each of the candidate edges is a closed edge, based at least in part on relationships between the nodes.

In one general aspect, a system includes a processor and logic integrated with the processor, executable by the processor, or integrated with and executable by the processor. The logic is configured to use an image segmentation technique to detect points and edges in an image and classify at least some of the edges into candidate edges and strong edges based at least in part on a confidence level assigned to the respective edge. For the points detected in the image, the logic is configured to use a convolution operation to extract visual information around the respective point and generate a graph structure including nodes based on the detected points and edges. Generating the graph structure includes using the visual information to assign initial information values to the nodes and updating nodes in the graph structure with information about neighboring nodes. The logic is configured to determine whether each of the candidate edges is a closed edge, based at least in part on relationships between the nodes.

In another general aspect, a computer-implemented method includes detecting points in an image of surface particles of a material, detecting edges in the image, and classifying at least some of the edges into candidate edges and strong edges based at least in part on a confidence level assigned to the respective edge. For the points detected in the image, the method includes using a convolution operation to extract visual information around the respective point and generating a graph structure including nodes based on the detected points and edges. Generating the graph structure includes determining whether a strong edge exists between adjacent pairs of the points and updating nodes in the graph structure with information about neighboring nodes. The method includes selecting candidate edges as closed edges based on relationships of the updated nodes in the graph structure.

In one general aspect, a computer program product includes one or more computer readable storage media, and program instructions collectively stored on the one or more computer readable storage media. The program instructions include program instructions to detect points in an image of surface particles of a material, detect edges in the image, and classify at least some of the edges into candidate edges and strong edges based at least in part on a confidence level assigned to the respective edge. The program instructions include program instructions to, for the points detected in the image, use a convolution operation to extract visual information around the respective point and generate a graph structure including nodes based on the detected points and edges. Generating the graph structure includes determining whether a strong edge exists between adjacent pairs of the points. The program instructions include program instructions to update nodes in the graph structure with information about neighboring nodes and select candidate edges as closed edges based on relationships of the updated nodes in the graph structure.

In one general aspect, a system includes a processor and logic integrated with the processor, executable by the processor, or integrated with and executable by the processor. The logic is configured to detect points in an image of surface particles of a material, detect edges in the image, and classify at least some of the edges into candidate edges and strong edges based at least in part on a confidence level assigned to the respective edge. For the points detected in the image, the logic is configured to use a convolution operation to extract visual information around the respective point and generate a graph structure including nodes based on the detected points and edges. Generating the graph structure includes determining whether a strong edge exists between adjacent pairs of the points and updating nodes in the graph structure with information about neighboring nodes. The logic is configured to select candidate edges as closed edges based on relationships of the updated nodes in the graph structure.

Figure 1:
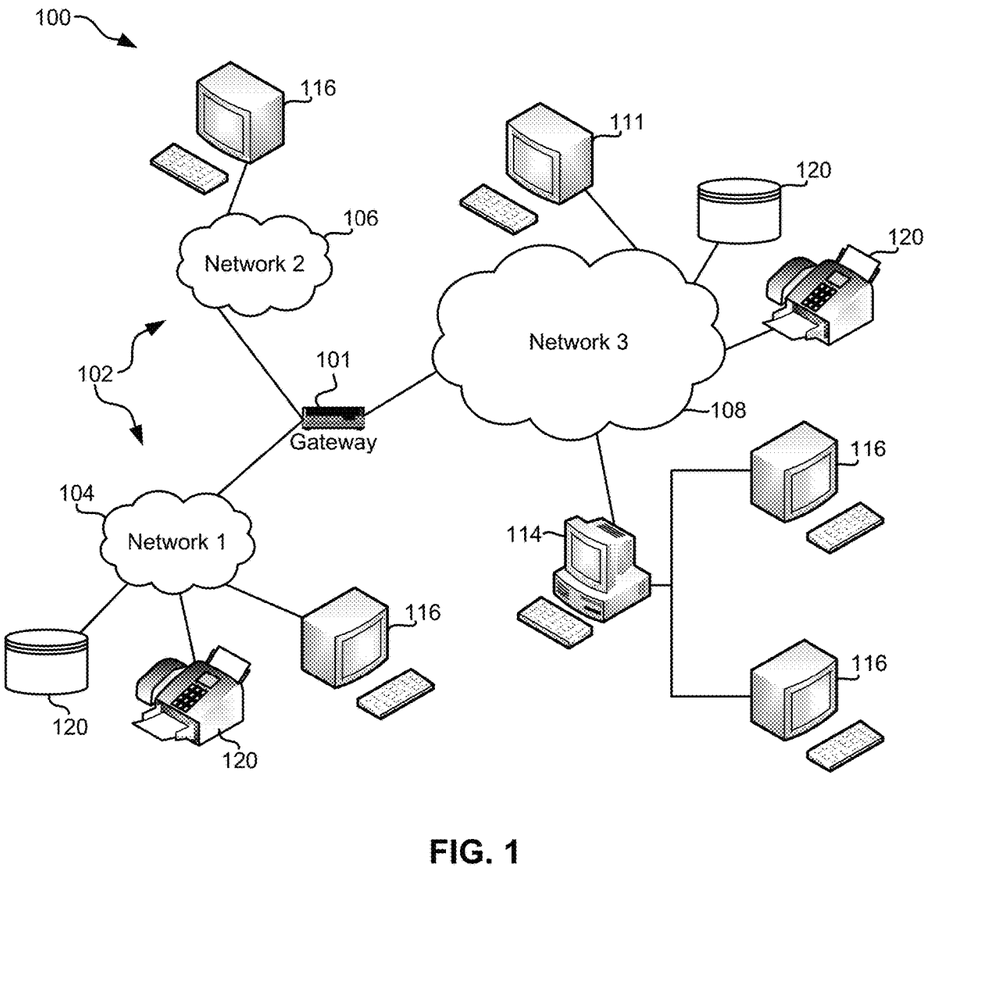
FIG. 1 is a diagram of a network architecture, in accordance with one aspect of the present invention.

FIG. 1 illustrates an architecture 100, in accordance with one aspect. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing de-vice/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one aspect.

A peripheral 120 or series of peripherals 120, e.g., facsimile machines, print-ers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM-based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some aspects.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
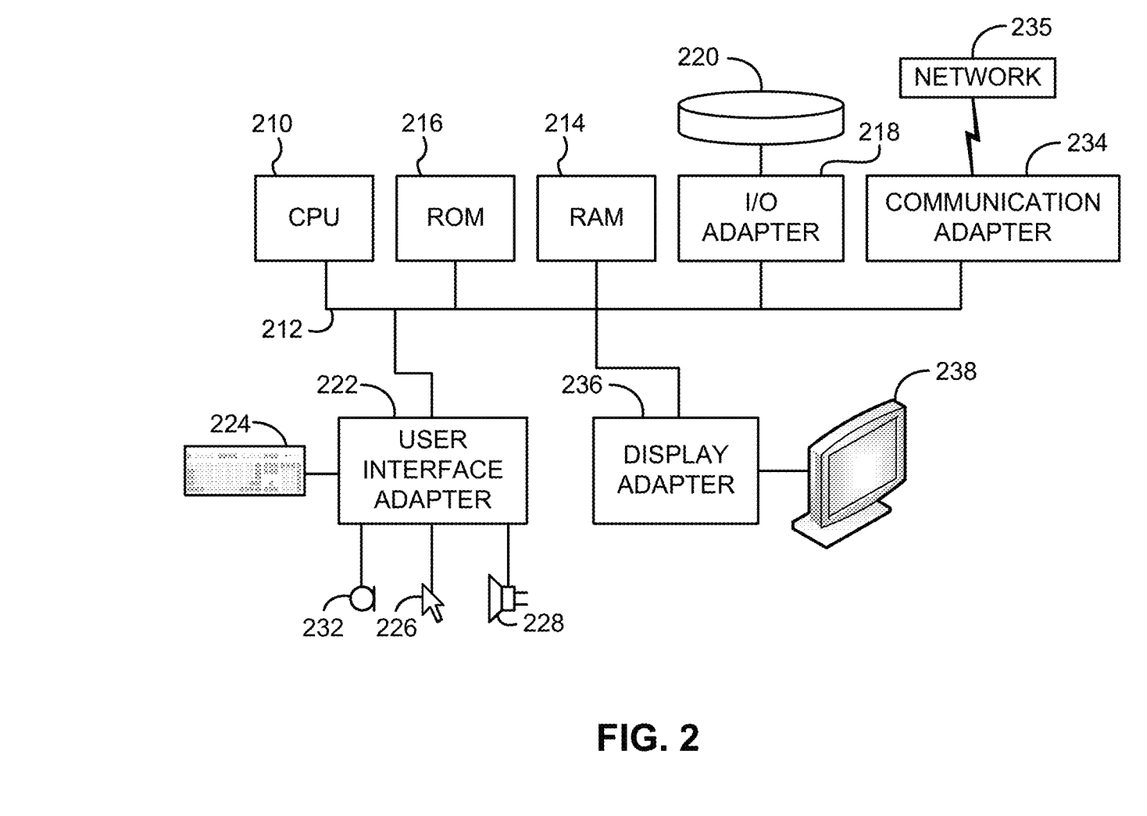
FIG. 2 is a diagram of a representative hardware environment that may be associated with the servers and/or clients of FIG. 1, in accordance with one aspect of the present invention.

FIG. 2 shows a representative hardware environment associated with a user device 116 and/or server 114 of FIG. 1, in accordance with one aspect. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred aspect may also be implemented on platforms and operating systems other than those mentioned. A preferred aspect may be written using extensible Markup Language (XML), C, and/or C++ language, or other programming languages, along with an object oriented programming methodology. Object oriented programming (OOP), which has become increasingly used to develop complex applications, may be used.

Grain size identification is often used to determine the quality of products, such as for the detection of imperfections in processed steel, nano-metal materials such as perovskite films, etc. Edge closures formed where edges of adjacent grains meet are difficult for machine vision recognition to detect. "Fuzzy" lines as used throughout the present disclosure may refer to lines which are distorted, out of focus, blurred, indefinite, incomplete, etc., as would become apparent to one having ordinary skill in the art upon reading the present disclosure. "Grain boundary," "edge," and their plural referents may be used interchangeably throughout the present disclosure unless otherwise noted herein to refer to an outer perimeter of a grain or portion thereof, where the outer perimeter typically has a substantially irregular and/or oblong shape, at least a portion of which is detectable by machine vision recognition technologies known in the art. Accordingly, by detecting edges, one is detecting the edge closures between grains. However, as noted above, where an edge closure is a fuzzy line in the image, such edge closure may not be detected with high confidence, if at all.

Data scientists may use image preprocessing methods including adjusting thresholds, grayscale transformation, neighborhood smoothing (e.g., for making the edge closures clearer), data annotations, etc., to train models for discrimination. Dense images are particularly difficult to label, and conventional segmentation techniques are unable to identify edge closures accurately. Dense images may be determinable by one having ordinary skill in the art. Additional challenges faced by image processing include inaccurate final quality judgements based on inaccurate edge closure identification, different types of photos have varying levels of accuracy with varying conventional techniques, training a model by manual labelling is difficult and time consuming, etc. For example, even when contrast is adjusted to the maximum (e.g., as in conventional techniques), the edges may remain unclear. Discontinuities in edges further inhibit reparation of the edge closures.

Figure 3A:
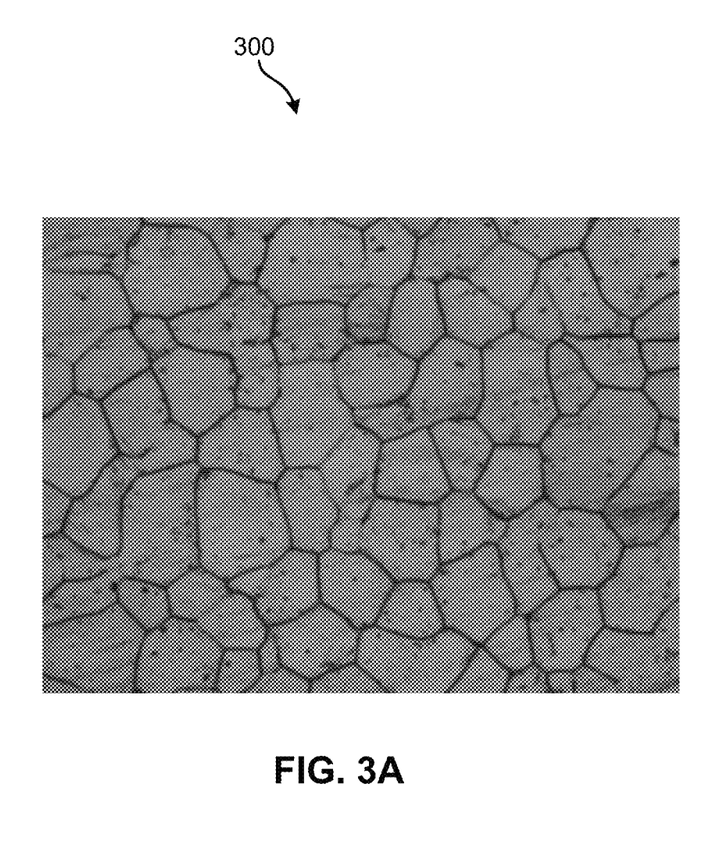
FIG. 3A is an exemplary metallographic image.
Figure 3B:
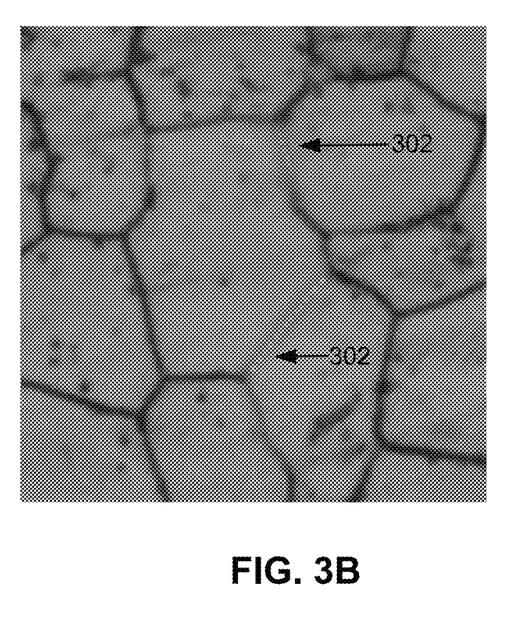
FIG. 3B is a magnified inset of the metallographic image of FIG. 3A.

FIG. 3A is an exemplary metallographic image 300. FIG. 3B is a magnified inset of the metallographic image 300. Two artificially marked, proposed fuzzy dividing lines 302 are shown. The contrast of the image 300 is adjusted to the maximum and the proposed dividing lines 302, as indicated by conventional detection techniques, are unclear. Conventional machine vision recognition approaches are unable to identify whether the proposed dividing lines 302 are true (e.g., accurate, legitimate, etc.) edges.

Various aspects of the present disclosure provide a method for analyzing edge closures of surface particles based on a graph structure. In preferred aspects, the surface particles to be analyzed are metal surface particles of any type. For example, the metal surface particles may include a perovskite film (e.g., a mineral calcium titanium oxide), metal alloys including iron (Fe) and/or carbon (c), cooper (Cu) alloys, etc. At least some aspects include processing the texture of the surface in an image into a graph structure, and based on the graph structure, making judgements about the connectivity and/or existence of edges in the image. In at least one approach, the connectivity between two "breakpoints" in an image is used to analyze the closeness of the edges of the particles on the metal surface. The process by which grain lines (e.g., edges and corresponding edge closures) form on the metal surface is a series of physical processes. The reason for the formation of the edge is inseparable from the "environment" (e.g., context) formed by other lines around it. A basic unit that constitutes an edge is a line segment formed between the two end points of the line segment. The visual features and the structural information of the graph may be used to predict whether there is a line segment between the end points.

Figure 4:
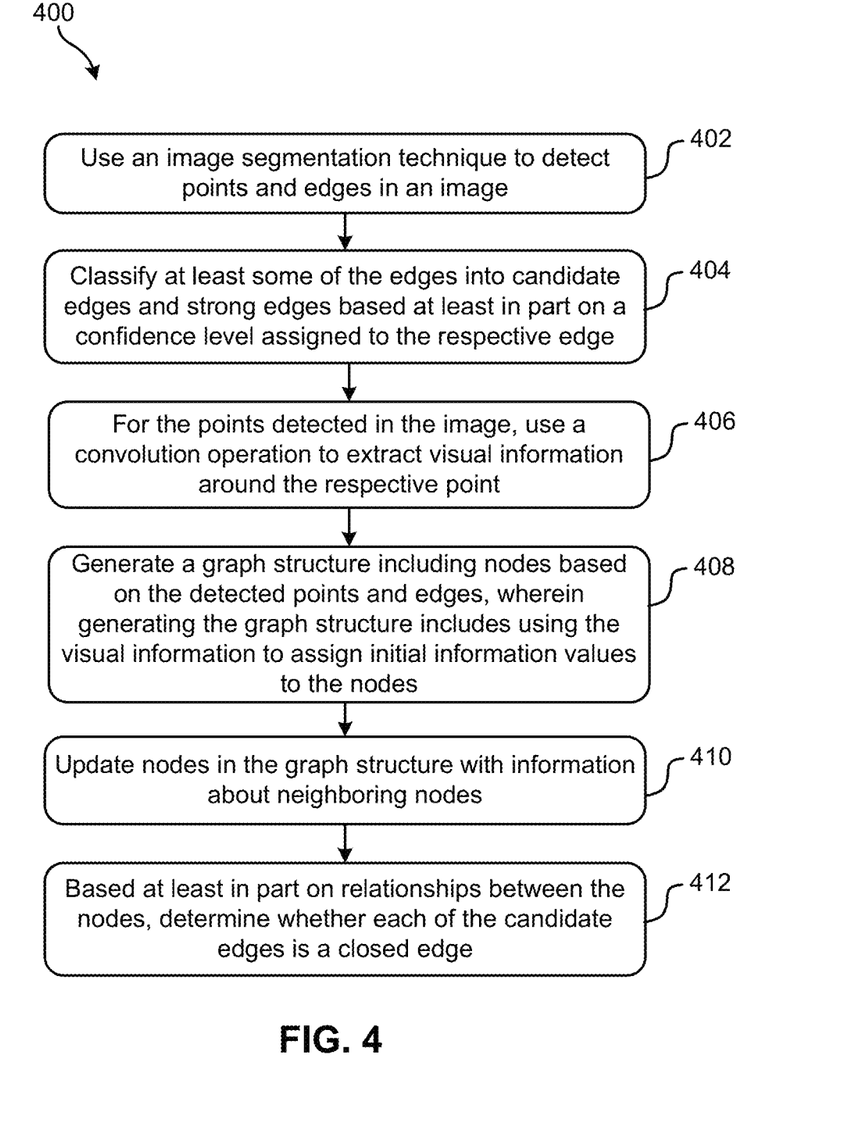
FIG. 4 is a flowchart of a method, in accordance with one aspect of the present invention.

Now referring to FIG. 4, a flowchart of a method 400 for analyzing edges and edge closures shown in an image of metal surface particles is shown according to one aspect. The method 400 may be performed in accordance with the present invention in any of the environments depicted in FIGS. 1-7, among others, in various aspects. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various aspects, the method 400 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 includes operation 402. Operation 402 includes using an image segmentation technique to detect points and edges in an image. Exemplary image segmentation techniques may include U-Net, region-based segmentation, edge detection segmentation, segmentation-based on clustering, Mask-R-CNN, approach-based classification, boundary-based approaches, watershed segmentation, neural networks for segmentation, thresholding segmentation, etc. Image segmentation techniques may include any process for partitioning a digital image into multiple segments (e.g., sets of pixels, individual pixels, image objects, etc.), in a manner known in the art. For example, image segmentation techniques may be used to assign labels to substantially all pixels in an image such that pixels with the same label share similar characteristics. In at least some approaches, image segmentation techniques used herein may include machine vision recognition technology of known type, and vice versa. Exemplary types of images may include metallurgical images, near-infrared (NIR) spectroscopy images, etc. In preferred aspects, the image is a digital image.

Operation 404 includes classifying at least some of the edges into candidate edges and strong edges based at least in part on a confidence level assigned to each edge. In preferred aspects, the image segmentation technique used above is able to identify boundaries (e.g., edges and potential edges) in the image. In further preferred aspects, the image segmentation technique used to identify the points and edges in the image is able to assign confidence levels to the edges in a manner known in the art. Alternatively, a different machine vision recognition technique of known type may be used to assign the confidence levels. Confidence levels may be defined and used to differentiate the type of edge. Any confidence level thresholds and/or ranges may be used in various approaches. In one exemplary approach, the image segmentation technology is able to classify edges as being strong edges if the respective edge has a confidence level of greater than or equal to 0.7; while edges may be designated as being candidate edges if the respective edge has a confidence level between 0.2 and 0.7. Any detected edge having a confidence level below 0.2 may be no longer considered an edge and thus discarded (e.g., not used in further analysis described herein).

In at least some approaches, operation 404 includes creating an edge list comprising the strong edges and the candidate edges and corresponding confidence levels. The edge list may be stored in any manner known in the art. For example, the edge list may be stored as a table.

In various aspects, the detected points may be classified into intersection points, end points, free points, etc., based at least in part on the surrounding image area (e.g., based at least in part on the detected edges). "Intersection points" refer to intersection points of two or more line segments (e.g., of two or more of the strong edges, a strong edge and a candidate edge, two or more candidate edges). "End points" refer to the end point(s) of a strong edge. "Free points" refer to isolated points (e.g., points having no discernable line segment related thereto).

Operation 406 includes, for points detected in the image, using a convolution operation to extract visual information around the respective point. For example, each point may be taken as the center and a convolution operation may be performed on the surrounding image area. The convolution operation may be a mathematical operation on two functions which produces a third function that expresses how the shape of one function is modified by the other, as would be understood by one having ordinary skill in the art. In some approaches, the convolution operation includes at least the first 3 layers of Visual Geometry Group (VGG) to extract the visual information around each point as the center.

The visual information may include how many strong edges surround the point (e.g., coupled thereto and/or in a predetermined radius thereof), how many candidate edges surround the point (e.g., coupled thereto and/or in a predetermined radius thereof), the location of strong edges and/or candidate edges surrounding the point, etc., or any combination thereof. In preferred approaches, a convolution operation is performed for each point detected in the image. In other approaches, a convolution operation is used for at least some of the points detected in the image.

In various aspects, the visual information extracted by the convolution algorithm may be used to assign an initial value (e.g., an initial information value) to the corresponding point.

In at least some approaches, operation 406 includes creating a point list comprising the intersection points, the end points, and the free points. The point list may be stored in any manner known in the art. For example, the point list may be stored as a table. In at least some approaches, the point list may include any candidate edges, strong edges, corresponding confidence levels, etc., related thereto. Relativity between points and candidate edges, strong edges, corresponding confidence levels, etc., may be defined as a physical relationship determined by any machine vision recognition technology known in the art.

Operation 408 includes generating a graph structure including nodes based on the detected points and edges, using any known technique that would become apparent to one having ordinary skill in the art upon reading the present disclosure. According to various aspects described herein, a node may refer to a point having at least one strong edge coupled thereto. For example, detected free points may not be considered to be a node and discarded (e.g., not used in further analysis). In preferred aspects, generating the graph structure includes using the visual information to assign initial information values to the nodes. The detected points and edges may be represented in the graph structure where a logical connection coincides with an edge between two points.

Operation 410 includes updating nodes in the graph structure with information about their neighboring nodes. In at least some approaches, in response to assigning the initial information values to the nodes, graph coding methods known in the art (e.g., such as DeepWalk, breadth first search (BFS), depth first search (DFS), topological sorting, minimum spanning tree, etc.) may be used to update and save the initial information of neighbor nodes for each of the nodes to create "environmental information." Neighboring nodes may include nodes which are connected by an edge and/or which are within a predetermined distance of each other.

After updating the information of the nodes in the graph structure, in various approaches, the connectivity of each candidate edge is detected based at least in part on the embedding of the nodes. In at least one aspect, a Siamese Neural Network matching network may be used to determine the connectivity, using the Unicom mode as a positive sample and using the free nodes and the nearest node as a negative sample. The trained network may accept any two nodes as output. In various approaches, the output is the confidence of the connectivity for the two nodes (e.g., between about 0 and about 1). In some approaches, if the two nodes have strong connectivity according to some predefined criteria, the candidate edge may be determined to be a strong edge between the two nodes. In contrast, if the two nodes have weak connectivity according to other predefined criteria, no edge exists between the two nodes (e.g., the candidate edge is not an edge, the candidate edge is invalid, etc.). In various approaches, predefined criteria for strong and/or weak connectivity may be determinable by one having ordinary skill in the art.

Operation 412 includes, based at least in part on relationships between the nodes, determining whether each of the candidate edges is a closed edge. An identification of the edges in the image determined to be closed may be output, e.g., in list form, in graphical form, in data form for use by another process, on the image itself e.g., as an enhancement to the image (e.g., as a bolder grain edge), etc. Edges that are not considered closed can be discarded, etc.

A candidate edge may be evaluated and determined to be a closed edge based at least in part on the relationships between the nodes including "connectivity" predictions of a type that would become apparent to one skilled in the art upon reading the present disclosure.

In various approaches, operation 412 may include determining, based at least in part on relationships between the nodes, whether each of the strong edges is a closed edge. In preferred approaches, strong edges are assumed to be closed edges. In at least one approach, the candidate edge may be determined to be a strong edge, e.g., the classification of the edge may change from a candidate edge to a closed edge.

In various approaches, method 400 may include detecting imperfections in a product shown in the metallurgical image using a technique which would become apparent to one skilled in the art upon reading the present disclosure. For example, imperfections may be associated with incomplete edges, non-conforming grain shapes (e.g., formed by the closed edges), etc.

Figure 5A:
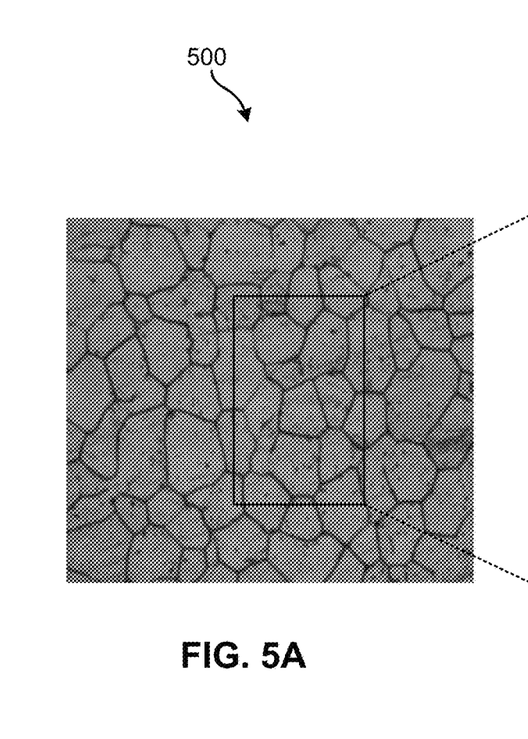
FIG. 5A is an exemplary metallographic image.
Figure 5B:
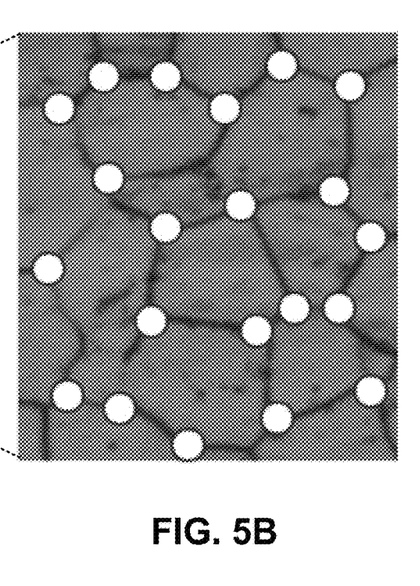
FIG. 5B is a magnified inset of the metallographic image of FIG. 5A.
Figure 5C:
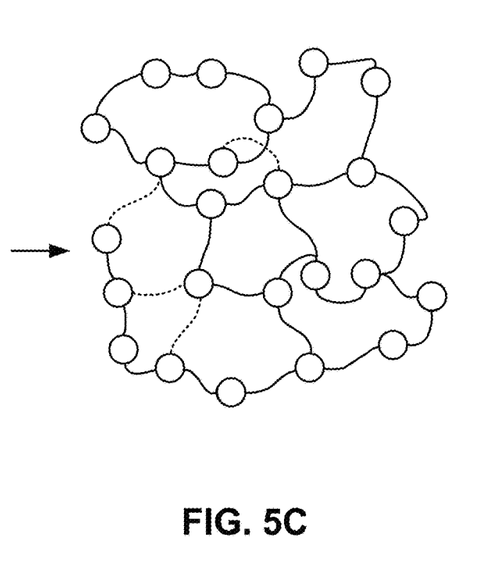
FIG. 5C is a logical diagram for the image of FIG. 5A.

FIG. 5A is an exemplary metallographic image 500. FIG. 5B is a magnified inset of the metallographic image 500 having detected points shown therein. FIG. 5C is a logical diagram for the image 500 comprising the detected points, candidate edges (dotted lines), and strong edges (solid lines).

Figure 6:
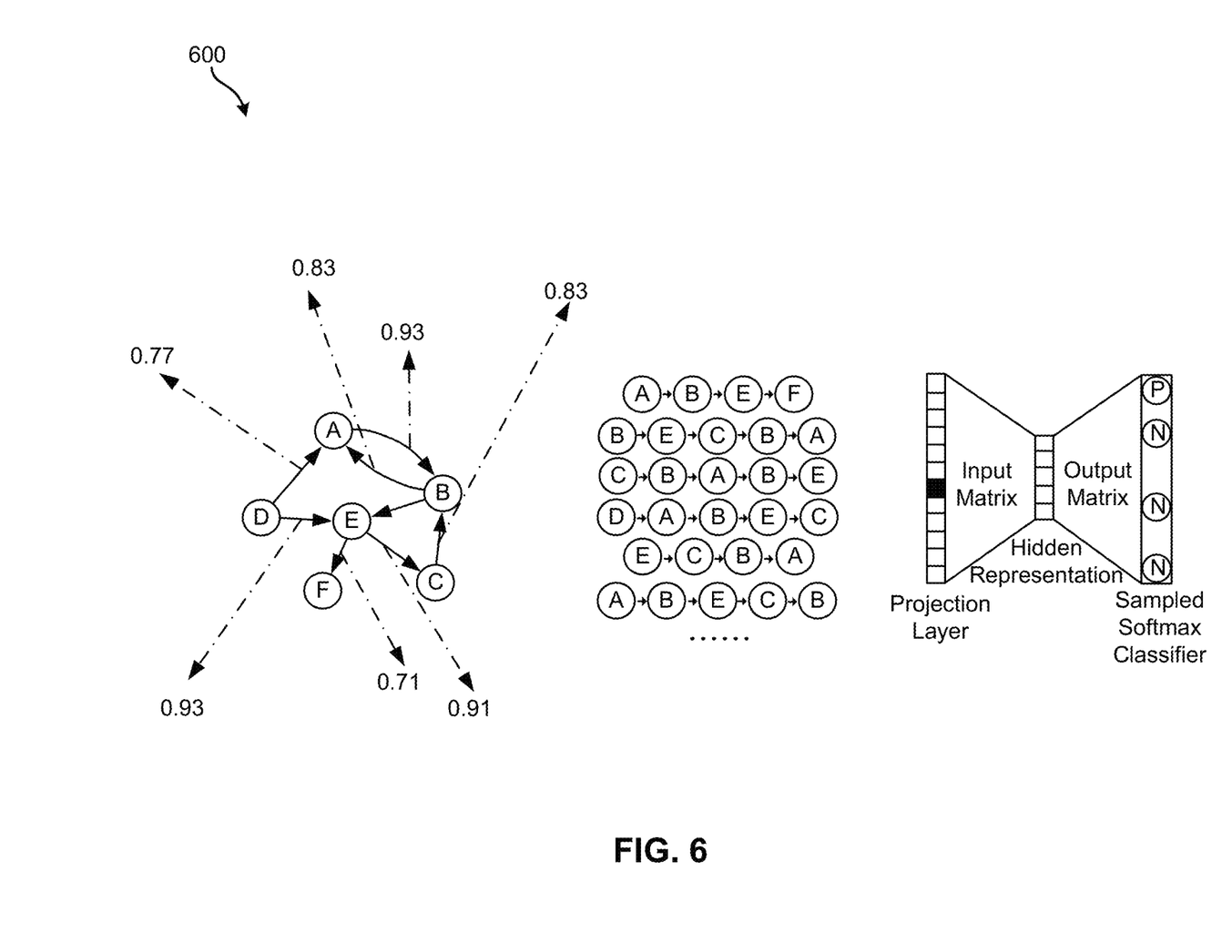
FIG. 6 is an exemplary implementation, in accordance with one aspect of the present invention.

FIG. 6 depicts an exemplary implementation 600, in accordance with one aspect. As an option, the present implementation 600 may be implemented in conjunction with features from any other aspect listed herein, such as those described with reference to the other FIGS. Of course, however, such implementation 600 and others presented herein may be used in various applications and/or in permutations which may or may not be specifically described in the illustrative aspects listed herein. Further, the implementation 600 presented herein may be used in any desired environment.

The exemplary implementation 600 includes an illustration of a Deepwalk algorithm applied to a graph structure for an image. The graph structure, as shown, includes edges with corresponding confidence levels and nodes corresponding to detected points. In at least some approaches, an embedding algorithm known in the art may be used to analyze the graph structure to update bearer information, e.g., bearer identifiers, etc., of each node. The updates for each node include adding at least the information of any neighbor nodes (e.g., such as surrounding context information, environmental information, etc.) to the bearer information for each of the nodes. In various approaches, the Deepwalk algorithm may use edge weights (as shown) and/or a graph convolutional network (GCN) to perform the updates of the bearer information for each node. The exemplary implementation 600 optimizes the Deepwalk of the image segmentation for making the edge corresponding to the edge with clearer and stronger visual information (e.g., the strong edge(s)) occupy more information weight when the algorithm generates the node vector.

In at least some approaches, a logical diagram may be created for the image including the points and edges detected using the image segmentation techniques described herein. The visual information may be extracted from the logical diagram and used to update the bearer information and/or the graph structure, in at least some aspects.

Figure 7:
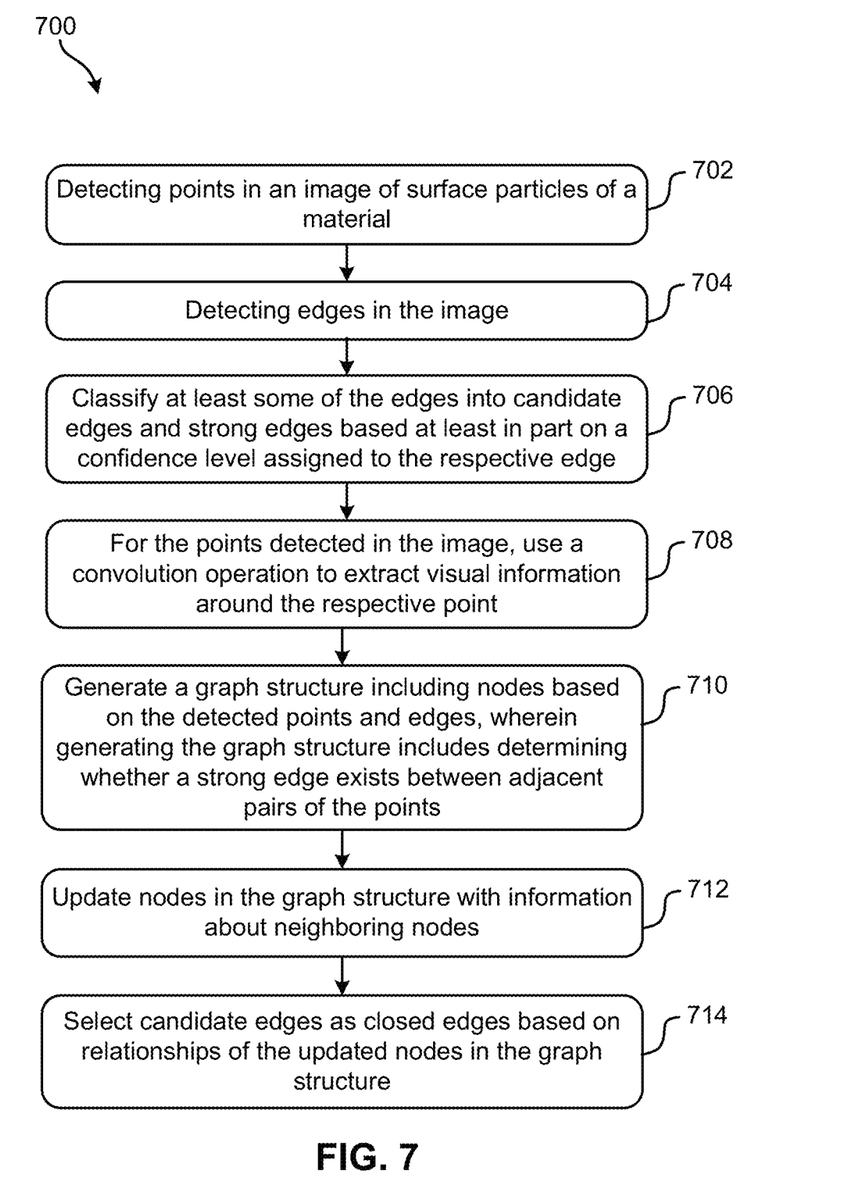
FIG. 7 is a flowchart of a method, in accordance with one aspect of the present invention.

Now referring to FIG. 7, a flowchart of a method 700 is shown according to one aspect. The method 700 may be performed in accordance with the present invention in any of the environments depicted in FIGS. 1-6, among others, in various aspects. Of course, more or fewer operations than those specifically described in FIG. 7 may be included in method 700, as would be understood by one of skill in the art upon reading the present descriptions.

Each of the steps of the method 700 may be performed by any suitable component of the operating environment. For example, in various aspects, the method 700 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 includes operation 702. Operation 702 includes detecting points in an image of surface particles of a material. In at least some preferred approaches, image segmentation technology techniques known in the art, such as those described herein, may be used to detect the edges.

Operation 704 includes detecting edges in the image. The edges are similarly detected using image segmentation techniques as described herein.

Operation 706 includes classifying at least some of the edges into candidate edges and strong edges based at least in part on a confidence level assigned to each edge. In preferred aspects, the image segmentation technique is able to identify boundaries (e.g., edges and potential edges) in the image. In further preferred aspects, the image segmentation technique used to identify the points and edges in the image is able to assign confidence levels to the edges in a manner known in the art. In various aspects, the image segmentation technique is able to classify edges as being strong edges having a confidence level of greater than or equal to 0.7 (or other desired value). In further approaches, the image segmentation technique is able to classify edges as being candidate edges having a confidence level between 0.2 and 0.7 (or other desired range). Any detected edges having a confidence level below 0.2 (or other desired value below the aforementioned range) is no longer considered an edge and is discarded (e.g., not used in further analysis described herein).

In operation 708, a convolution operation is used to extract visual information around each point. In various aspects, the visual information about each point may be used to assign an initial value to the corresponding node in a graph structure. During the convolution operation, each point may be taken as the center and a convolution operation may be performed on the surrounding image area. The convolution operation may be a mathematical operation on two functions which produces a third function that expresses how the shape of one function is modified by the other, as would be understood by one having ordinary skill in the art. In some approaches, the convolution operation includes at least the first 3 layers of Visual Geometry Group (VGG) to extract the visual information around each point as the center. The extracted visual information may be used to assign an initial value to the node corresponding to the point. Embedding may be obtained by the convolution operation and the initial value of each point may be based at least in part on the embedding. In some approaches, the embedding provides at least some of the information about the neighboring nodes.

Operation 710 includes generating a graph structure via known techniques. The graph structure includes nodes based on the detected points and edges. According to various aspects described herein, a node may refer to a point having at least one strong edge coupled thereto. In preferred aspects, generating the graph structure includes determining whether a strong edge exists between adjacent pairs of the points. A logical connection is considered to exist between two points if a strong edge (at the visual level) is detected between two points. This logical connection is deemed an edge between nodes in the graph, where such "edge" used in the graph denotes connectivity between the two points. Accordingly, the graph structure includes nodes and edges (denoting connectivity between nodes, but not to be confused with visual edges).

Operation 712 includes updating nodes in the graph structure with information about the neighboring nodes. In at least some approaches, in response to assigning the initial information values to the nodes, graph coding methods known in the art may be used to update and save the initial information of neighbor nodes for each of the nodes to create "environmental information."

After updating the information of the nodes in the graph structure, in various approaches, the connectivity of each candidate edge is detected based at least in part on the embedding of the nodes. Any technique known in the art may be used to detect the connectivity. In at least one aspect, a Siamese Neural Network matching network may be used to determine the connectivity, using the Unicom mode as a positive sample and using the free nodes and the nearest node as a negative sample. The trained network may accept any two nodes as output. In various approaches, the output is the confidence of the connectivity for the two nodes (e.g., between about 0 and about 1). In some approaches, if the two nodes have strong connectivity, the candidate edge may be determined to be a strong edge between the two nodes. In contrast, if the two nodes have weak connectivity, no edge exists between the two nodes (e.g., the candidate edge is not an edge, the candidate edge is invalid, etc.). Predefined criteria for defining strong connectivity and/or weak connectivity would be determinable by one having ordinary skill in the art in view of the present disclosure.

Operation 714 includes selecting candidate edges as closed edges based on relationships between the nodes. A candidate edge may be reevaluated and determined to be a closed edge based at least in part on the relationships between the nodes including "connectivity" predictions of a type that would become apparent to one skilled in the art upon reading the present disclosure. For example, if two nodes show strong connectivity, it is considered that there is an edge between the two nodes at the physical level. If the two nodes show weak or no connectivity, it is considered that the two nodes do not have an edge at the physical level.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
using an image segmentation technique to detect points and edges in an image;
classifying at least some of the edges into candidate edges and strong edges based at least in part on a confidence level assigned to the respective edge;
for the points detected in the image, using a convolution operation to extract visual information around the respective point;
generating a graph structure including nodes based on the detected points and edges, wherein generating the graph structure includes using the visual information to assign initial information values to the nodes;
updating nodes in the graph structure with information about neighboring nodes; and
based at least in part on relationships between the nodes, determining whether each of the candidate edges is a closed edge.

2. The computer-implemented method of claim 1, wherein the points are classified into intersection points, end points and free points based at least in part on the detected edges.

3. The computer-implemented method of claim 1, wherein the strong edges have a confidence level greater than or equal to about 0.7.

4. The computer-implemented method of claim 1, wherein the candidate edges have a confidence level between about 0.2 and about 0.7.

5. The computer-implemented method of claim 1, wherein the image is a metallurgical image.

6. The computer-implemented method of claim 5, comprising detecting imperfections in a product shown in the metallurgical image.

7. A computer program product, the computer program product comprising:
one or more computer readable storage media, and program instructions collectively stored on the one or more computer readable storage media, the program instructions comprising:
program instructions to use an image segmentation technique to detect points and edges in an image;
program instructions to classify at least some of the edges into candidate edges and strong edges based at least in part on a confidence level assigned to the respective edge;
program instructions to, for the points detected in the image, use a convolution operation to extract visual information around the respective point;
program instructions to generate a graph structure including nodes based on the detected points and edges, wherein generating the graph structure includes using the visual information to assign initial information values to the nodes;
program instructions to update nodes in the graph structure with information about neighboring nodes; and
program instructions to determine whether each of the candidate edges is a closed edge, based at least in part on relationships between the nodes.

8. The computer program product of claim 7, wherein the points are classified into intersection points, end points and free points based at least in part on the detected edges.

9. The computer program product of claim 7, wherein the strong edges have a confidence level greater than or equal to about 0.7.

10. The computer program product of claim 7, wherein the candidate edges have a confidence level between about 0.2 and about 0.7.

11. The computer program product of claim 7, wherein the image is a metallurgical image.

12. The computer program product of claim 11, comprising program instructions to detect imperfections in a product shown in the metallurgical image.

13. A system, comprising:
a processor; and
logic integrated with the processor, executable by the processor, or integrated with and executable by the processor, the logic being configured to:

use an image segmentation technique to detect points and edges in an image;

classify at least some of the edges into candidate edges and strong edges based at least in part on a confidence level assigned to the respective edge;

for the points detected in the image, use a convolution operation to extract visual information around the respective point;

to generate a graph structure including nodes based on the detected points and edges, wherein generating the graph structure includes using the visual information to assign initial information values to the nodes;

update nodes in the graph structure with information about neighboring nodes; and determine whether each of the candidate edges is a closed edge, based at least in part on relationships between the nodes.

14. The system of claim 13, wherein the points are classified into intersection points, end points and free points based at least in part on the detected edges.

15. The system of claim 13, wherein the strong edges have a confidence level greater than or equal to about 0.7.

16. The system of claim 13, wherein the candidate edges have a confidence level between about 0.2 and about 0.7.

17. The system of claim 13, wherein the image is a metallurgical image.

18. The system of claim 17, comprising logic configured to detect imperfections in a product shown in the metallurgical image.

19. A computer-implemented method, comprising:
detecting points in an image of surface particles of a material;
detecting edges in the image;
classifying at least some of the edges into candidate edges and strong edges based at least in part on a confidence level assigned to the respective edge;
for the points detected in the image, using a convolution operation to extract visual information around the respective point;
generating a graph structure including nodes based on the detected points and edges, wherein generating the graph structure includes determining whether a strong edge exists between adjacent pairs of the points;
updating nodes in the graph structure with information about neighboring nodes; and
selecting candidate edges as closed edges based on relationships of the updated nodes in the graph structure.

20. The computer-implemented method of claim 19, wherein each point is taken as the center in the convolution operation.

21. The computer-implemented method of claim 19, wherein the edges and points are detected in the image using image segmentation technology.

22. The computer-implemented method of claim 19, wherein the nodes in the graph structure are updated with embedding, wherein the embedding for each node is obtained by the convolution operation, wherein the embedding provides at least some of the information about the neighboring nodes.

23. A computer program product, the computer program product comprising:
one or more computer readable storage media, and program instructions collectively stored on the one or more computer readable storage media, the program instructions comprising:
program instructions to detect points in an image of surface particles of a material;
program instructions to detect edges in the image;
program instructions to classify at least some of the edges into candidate edges and strong edges based at least in part on a confidence level assigned to the respective edge;
program instructions to, for the points detected in the image, use a convolution operation to extract visual information around the respective point;
program instructions to generate a graph structure including nodes based on the detected points and edges, wherein generating the graph structure includes determining whether a strong edge exists between adjacent pairs of the points;
program instructions to update nodes in the graph structure with information about neighboring nodes; and
program instructions to select candidate edges as closed edges based on relationships of the updated nodes in the graph structure.

24. The computer program product of claim 23, wherein each point is taken as the center in the convolution operation.

25. The computer program product of claim 23, wherein the edges and points are detected in the image using image segmentation technology.

* * * * *